March 24, 1970     H. A. HOWELL     3,502,923

ELECTRIC MOTORS AND GENERATORS

Filed Feb. 23, 1967

INVENTOR.
HARLAN A. HOWELL

BY *Harlan A. Howell*

United States Patent Office 3,502,923
Patented Mar. 24, 1970

3,502,923
ELECTRIC MOTORS AND GENERATORS
Harlan A. Howell, 1926 Thoreau St.,
Los Angeles, Calif. 90047
Filed Feb. 23, 1967, Ser. No. 619,517
Int. Cl. H02k 23/42
U.S. Cl. 310—187                     7 Claims

ABSTRACT OF THE DISCLOSURE

An electric machine with an armature and a magnetic field structure is provided with a region of high reluctance extending radially through the lateral mid-portion of at least one pole-piece of the magnetic field structure. The high reluctance region prevents the passage of armature cross-magnetic field flux through the pole pieces while it has little effect on the main magnetic field.

My invention relates to a new and improved type magnetic field structure for electric motors and generators, but not necessarily limited thereto, and has for its purpose the prevention of certain undesirable effects such as are inherent in the present type of magnetic field structures of electric motors, generators, etc.

Focussing first on the present type of magnetic field structures of direct-current motors and generators and some types of alternating-current motors in general use today we find that when their armatures are loaded certain undesirable effects occur. More specifically, when current flows through the armature conductors there is produced a cross-magnetic field which lies at 90 electrical degrees to the main magnetic field and adds vectorially to the main magnetic field, producing a resultant field which lies in a different direction from the main magnetic field, thus causing a shift in the commutating plane which, as a result, has the same effect as shifting the brushes out of their neutral position. This in turn results in poor commutation, and at a time when the armature current is high, which leads to a general deterioration of commutator and brushes.

In the accompanying drawings, FIGURE 1 and 2 embody my invention, as will become apparent.

Although a 2-pole design is shown in each of the illustrations of the magnetic field structures (FIGS. 1 and 2), my invention is applicable to magnetic field structure designs having any number of poles that could be used.

Figure 3:
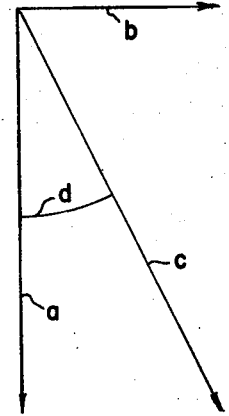
Figure 4:

In the accompanying drawing, FIGS. 3 and 4 (here only FIG. 4 relates to my invention) each is a vector diagram depicting the relation of the main magnetic field $a$ to the armature cross-magnetic field $b$, and showing the resultant field $c$, with its displacement angle $d$.

Figure 1:
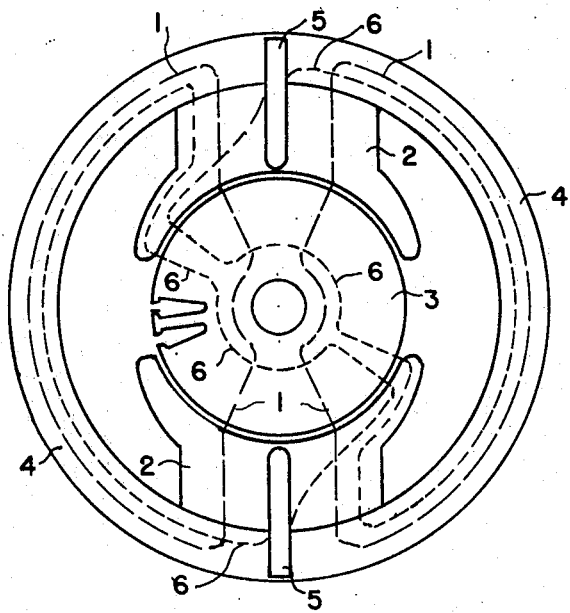
FIG. 1 is an illustration of a salient 2-pole type magnetic field structure with its associated armature (not all of the armature teeth are shown), such as could be used in electric motors and generators, and showing the magnet circuits of the machine.

Referring now to FIG. 1, the path of the main magnetic field 1 is through the upper pole-piece 2, through the armature 3, through the lower pole-piece 2, whence it splits, or parts, and passes through the yoke 4 and returns again to upper pole-piece 2, thus completing its circuit. Now with particular reference to the tranverse apertures 5, which are through the pole-pieces 2 and the yoke 4 and constitute absences of magnetic material within the magnetic field structure, it can be observed that said apertures 5 have little or no effect on the circuit of the main magnetic field 1, but significantly reduce the armature cross-magnetic field 6 because of the high reluctance introduced into its path or circuit by said apertures 5. The resultant great reduction of the armature cross-magnetic field 6, as can be seen, prevents the warping of the main field on the pole faces, thus greatly improving the performance of the machine.

Figure 2:
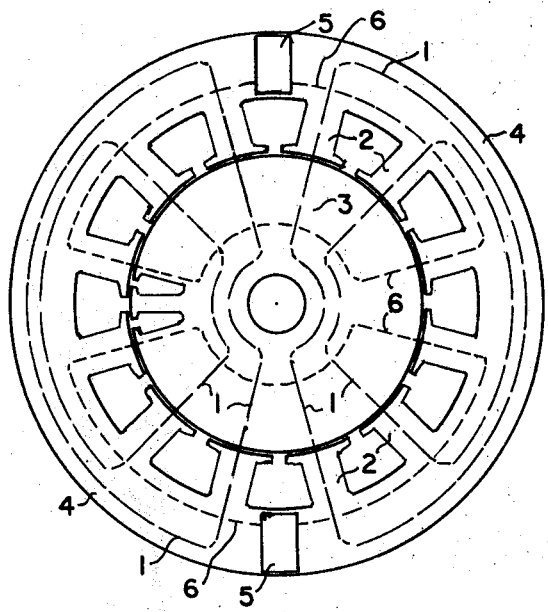
FIG. 2 is an illustration of a slotted 2-pole type magnetic field structure with its associated armature (not all of the armature teeth are shown), such as could be used electric motors and generators, and showing the magnetic circuits of the machine.

Referring to FIG. 2, the pole pattern of the main magnetic field 1 is defined by a proper winding (not shown here) installed in the field structure. The path of the said magnetic field 1 is through the upper stator teeth 2, through the armature 3, through the lower stator teeth 2, where it divides, or parts, and passes through the stator yoke 4 and returns to upper stator teeth 2, thus completing its circuit. As was shown in the salient-pole type illustration (FIG. 1), the traverse apertures 5 have little or no effect on the main magnetic field 1, but greatly reduce the armature cross-magnetic field 6 because of the high reluctance introduced into its path by these traverse apertures 5.

The effect of the armature cross-magnetic field is more pronounced in a slotted-stator type of field structure (see FIG. 2) than in the salient-pole type of field structure (see FIG. 1). In conventional designs of electric motors and generators in general use today the ease with which the armature cross-magnetic field can build up in a slotted type of field structure, due to the effective path provided by this type of design, normally requires a compensating winding to oppose the armature cross-magnetic field. This is not only expensive but leads to greater losses in the machine and thus lowers its efficiency. Because of this, designers have avoided the use of the slotted-stator type field structure for direct-current motors and generators.

To further describe what happens, first we will conventional type of magnetic field structure when its armature is loaded, and referring to FIG. 3, it shows vectorially that when the armature cross-magnetic field $b$ is rather strong the resultant field $c$ has a displacement angle $d$ which is proportionately large. This in turn causes the undesirable effects of poor commutation and bad wave form due to the shift in the commutating plane and warpage of the main magnetic field, as seen in FIG. 1.

The purpose of my invention is to have a magnetic field structure wherein the above-described undesirable effects do not occur. This is accomplished by having within the magnetic field structure a system of restrictions, later to be more fully described, said restrictions being an absence of magnetic material (see 5 in FIGS. 1 and 2). Now, to further illustrate this, and with particular attention to the accomplished result of such a field structure, referring to FIG. 4, in this case it shows vectorially that when the armature cross-magnetic field $b$ is suppressed (as by the apertures 5 in FIGS. 1 and 2), the resultant field $c$ has a displacement angle $d$ that is negligible. This, therefore, results in good communication plus good wave form, which is the outstanding merit of my invention.

To further describe present type magnetic field structures, the slotted type field structure has a number of advantages over the salient-pole type structure—to mention several—shorter magnetic paths, case and economy of construction, less weight, thus enabling the designer to build a smaller machine with a relatively higher output. But this requires the inclusion of an expensive and bulky compensating winding. However, when my invention is used it entirely eliminates the necessity for such a winding.

On the other hand, in the salient-pole type field structure which is in general use today, the magnetic path at 90 electrical degrees to the main magnetic field is rather weak, but the armature cross-magnetic field is warped and forced through the main pole tips which causes a crowding of the flux on the main pole faces. This in turn causes a warped wave form to be generated in the armature current and some shifting of the commutating plane, which also leads to poor communication.

The above-described conditions also prevail in the universal series-wound type of motor as used extensively on alternating-current and consequently their commutation is also adversely affected.

A similar condition exists in the field structures of synchronous motors and alternators where direct-current is used to excite the magnetic circuit to some flux value. Although no communication is involved in these machines the armature cross-magnetic field tends to warp and distort the main field flux which leads to the generation of poor wave forms which result in higher losses and lower efficiency.

My invention makes possible the design of new and superior magnetic field structures that are devoid of these foregoing undesirable characteristics.

To more fully describe the restrictions hereinbefore mentioned that are within the magnetic field structure and that are an inherent part of it, said restrictions are an absence of certain amounts of magnetic material (by magnetic material I mean any suitable substance of which the field structure could be made) and there being such a said restriction for each and every pole within the field structure, and it can be in the form of a slot, groove, hole, break, aperture or opening (see 5, FIGS. 1 and 2), the forms and shape being but a matter of degree, and said restrictions are located in the magnetic circuit part of the field structure in a position and of such shape so as not to interfere with the main magnetic field but to effect a maximum reduction of the armature cross-magnetic field with little or no effect on the magnetic circuit of the main magnetic field, these two fields occurring 90 electrical degrees to each other (see FIG. 4).

The purpose of these restrictions is to prevent the buildup of the armature cross-magnetic field and in so doing eliminate the undesirable effects caused by the presence of said field. Thus it can be seen that the armature cross-magnetic field is practically eliminated by means of greatly restricting its path rather than to oppose it with expensive and cumbersome compensating windings as is normally necessary in present type of field structures.

I claim:
1. In an electric machine having an armature and a magnetic field structure arranged to provide a main magnetic circuit through said armature and field structure that passes generally radially through two or more pole-pieces extending from said field structure radially toward and terminating near said armature, the improvement comprising the provision of:
   means in a radially extending lateral midportion of at least one pole-piece of said pole-pieces of siad magnetic field structure for providing a region of high reluctance in said pole-piece lateral midportion to prevent the passage of an armature cross-magnetic field induced magnetic circuit laterally through said pole-pieces while a main magnetic field induced main magnetic circuit passes radially through said pole-piece.

2. The electric machine of claim 1 wherein:
   said field structure includes a yoke mounting said two or more pole-pieces, and
   said means for providing a region of high reluctance in said pole-piece lateral midportion extends substantially into said yoke.

3. The electric machine of claim 2 wherein:
   said means for providing a region of high reluctance are provided in each of said pole-pieces.

4. The machine of claim 1 wherein:
   said means for providing a region of high reluctance comprises a radially extending air gap.

5. In an electric machine having an armature and a magnetic field structure including two or more poles extending therefrom radially toward and terminating near said armature and arranged to provide one or more main magnetic circuits through said armature and field structure that pass radially through said poles and about portions of said field structure, the improvement comprising the provision of:
   means in said magnetic field structure for providing a region of high reluctance in a lateral midportion therein in generally non-interfering relation to said main magnetic circuits about said portions of said field structure but in substantial interfering relation to armature cross-magnetic field induced magnetic circuits about other portions of said field structure.

6. The electric machine of claim 5 wherein:
   said magnetic field structure includes a yoke mounting said poles and
   said means for providing a region of high reluctance comprises at least one air gap formed in said yoke.

7. The electric machine of claim 5 wherein:
   said means in said magnetic field structure for providing a region of high reluctance therein are provided to extend radially of said field structure into a lateral midportion of at least one of said poles of said field structure to prevent the passage of an armature cross-magnetic field induced magnetic circuit laterally thereof through said field structure while a main magnetic field induced main magnetic circuit passes radially through said poles and through other portions of said field structure.

References Cited

UNITED STATES PATENTS

| | | | |
|---|---|---|---|
| 1,172,944 | 2/1916 | Collins | 310—187 XR |
| 3,296,472 | 1/1967 | Fisher | 310—192 XR |

FOREIGN PATENTS

| | | |
|---|---|---|
| 1,100,791 | 3/1961 | Germany. |

ORIS L. RADER, Primary Examiner

ALFRED C. COLLINS, Assistnt Examiner

U.S. Cl. X.R.

310—192

UNITED STATES PATENT OFFICE
CERTIFICATE OF CORRECTION

Patent No. 3,502,923                                        March 24, 1970

Harlan A. Howell

It is certified that error appears in the above identified patent and that said Letters Patent are hereby corrected as shown below:

Column 1, line 53, before "electric" insert -- in --. Column 2, line 56 and column 3, lines 6 and 14, "communication", each occurrence, should read -- commutation --; same column 2, line 35, after "will" insert -- consider a --; line 62, "case" should read -- ease --. Column 3, line 57, "siad" should read -- said --.

Signed and sealed this 22nd day of December 1970.

(SEAL)
Attest:

Edward M. Fletcher, Jr.                                WILLIAM E. SCHUYLER, JR.
Attesting Officer                                              Commissioner of Patents